United States Patent
Fedotov

(10) Patent No.: US 9,797,282 B2
(45) Date of Patent: Oct. 24, 2017

(54) METHOD FOR MOUNTING AN OIL SUMP AND ARRANGEMENT OF AN OIL SUMP ON AN ASSEMBLY FORMED BY A CRANKCASE AND A FLYWHEEL HOUSING

(71) Applicant: MAN Truck & Bus AG, Munich (DE)

(72) Inventor: Sergiy Fedotov, Nürnberg (DE)

(73) Assignee: MAN TRUCK & BUS AG, Munich (DE)

( * ) Notice: Subject to any disclaimer, the term of this patent is extended or adjusted under 35 U.S.C. 154(b) by 219 days.

(21) Appl. No.: 14/602,367

(22) Filed: Jan. 22, 2015

(65) Prior Publication Data

US 2015/0240676 A1 Aug. 27, 2015

(30) Foreign Application Priority Data

Feb. 26, 2014 (DE) .................. 10 2014 002 570

(51) Int. Cl.
| | |
|---|---|
| *F01M 1/02* | (2006.01) |
| *F01M 11/00* | (2006.01) |
| *B23P 19/04* | (2006.01) |
| *F02F 7/00* | (2006.01) |
| *F01M 11/02* | (2006.01) |
| *F02B 75/02* | (2006.01) |
| *B23P 19/10* | (2006.01) |

(52) U.S. Cl.
CPC ........ *F01M 11/0004* (2013.01); *B23P 19/042* (2013.01); *F02F 7/0046* (2013.01); *F02F 7/0073* (2013.01); *F02F 7/0082* (2013.01); *B23P 19/10* (2013.01); *F01M 1/02* (2013.01); *F01M 11/02* (2013.01); *F01M 2011/0054* (2013.01); *F01M 2011/0058* (2013.01); *F02B 2075/025* (2013.01); *Y10T 29/49231* (2015.01)

(58) Field of Classification Search
CPC ...... F01M 11/02; F01M 1/02; F01M 11/0004; F01M 2011/0054; F01M 2011/0058; F02B 2075/027; F02B 2075/025
USPC ..................................................... 123/196 R
See application file for complete search history.

(56) References Cited

U.S. PATENT DOCUMENTS

| | | | | |
|---|---|---|---|---|
| 5,119,928 A | * | 6/1992 | Driear .................. | B65G 23/22 198/319 |
| 2006/0169511 A1 | * | 8/2006 | Kurokawa ............. | B62K 11/00 180/219 |
| 2010/0181146 A1 | * | 7/2010 | Jessberger ......... | F01M 11/0004 184/106 |

FOREIGN PATENT DOCUMENTS

JP 10196452 A * 7/1998

\* cited by examiner

*Primary Examiner* — Jacob Amick
*Assistant Examiner* — Charles Brauch
(74) *Attorney, Agent, or Firm* — Lucas & Mercanti, LLP

(57) ABSTRACT

An oil sump is mounted on an assembly formed by a crankcase and a flywheel housing of an internal combustion engine. The flywheel housing has a first parting plane to the crankcase and to the oil sump. In mounted state, the joint faces of the flywheel housing, the crankcase, and the oil sump lie on each other. The crankcase has a second parting plane to the oil sump. In mounted state the joint faces of the crankcase and the oil sump lie on each other. At least one guide is provided between the flywheel housing and the oil sump, the guide orienting at least the joint faces of the oil sump and the crankcase relative to each other during connection of the oil sump to the assembly formed by the crankcase and flywheel housing, such that on creation of the abutment connection between the oil sump and the crankcase, these joint faces are oriented substantially planar parallel.

13 Claims, 6 Drawing Sheets

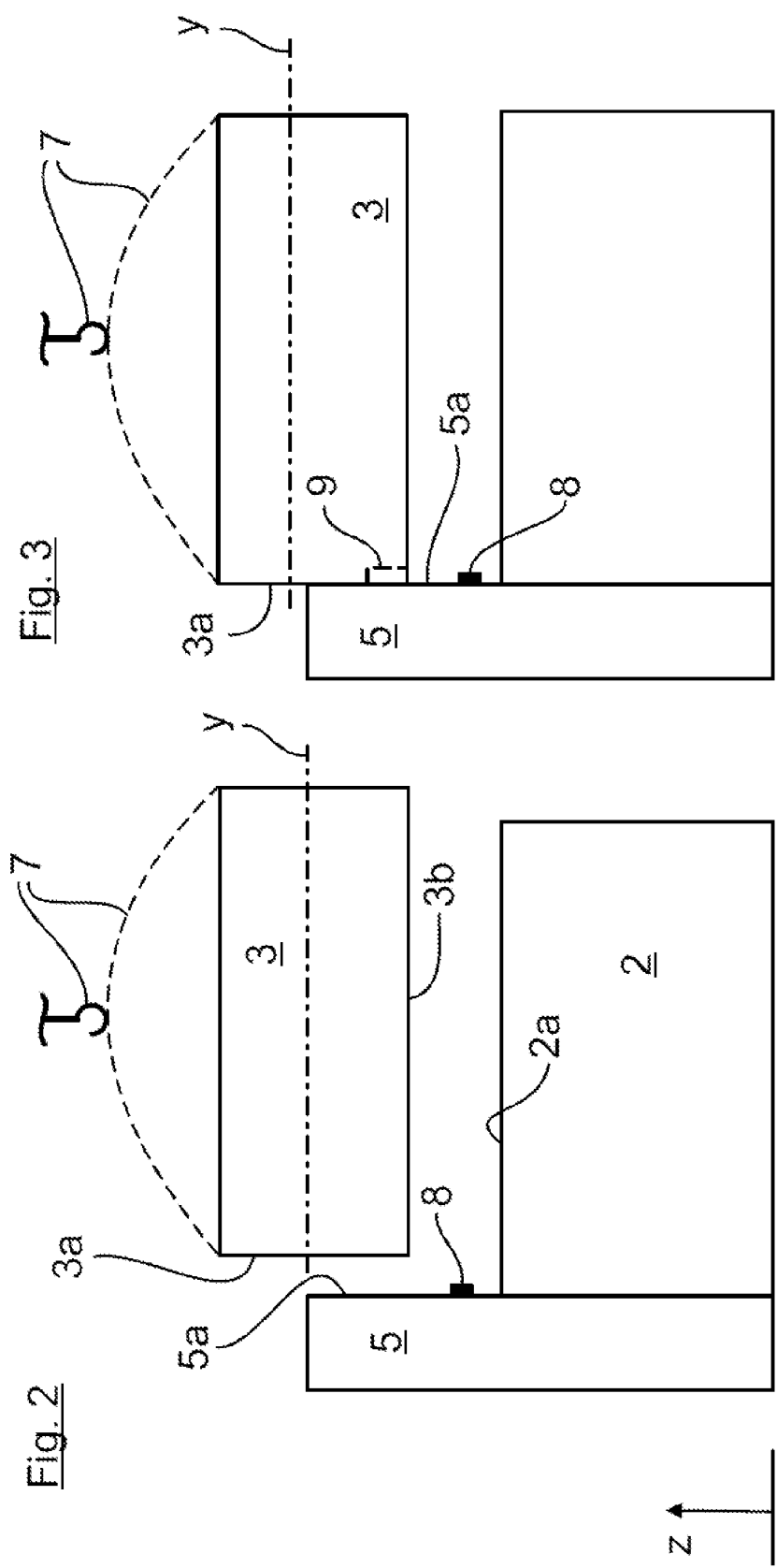

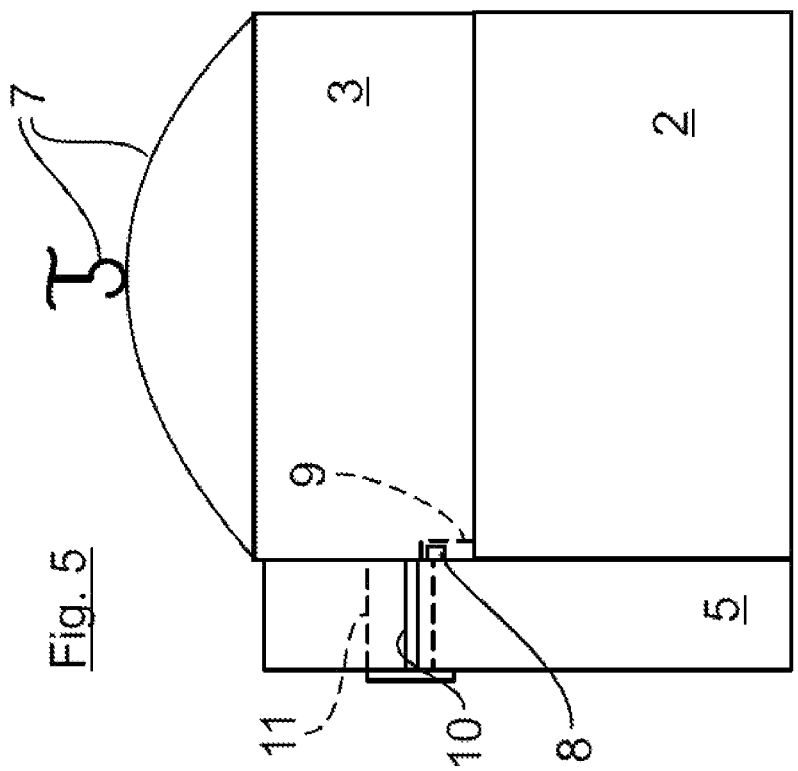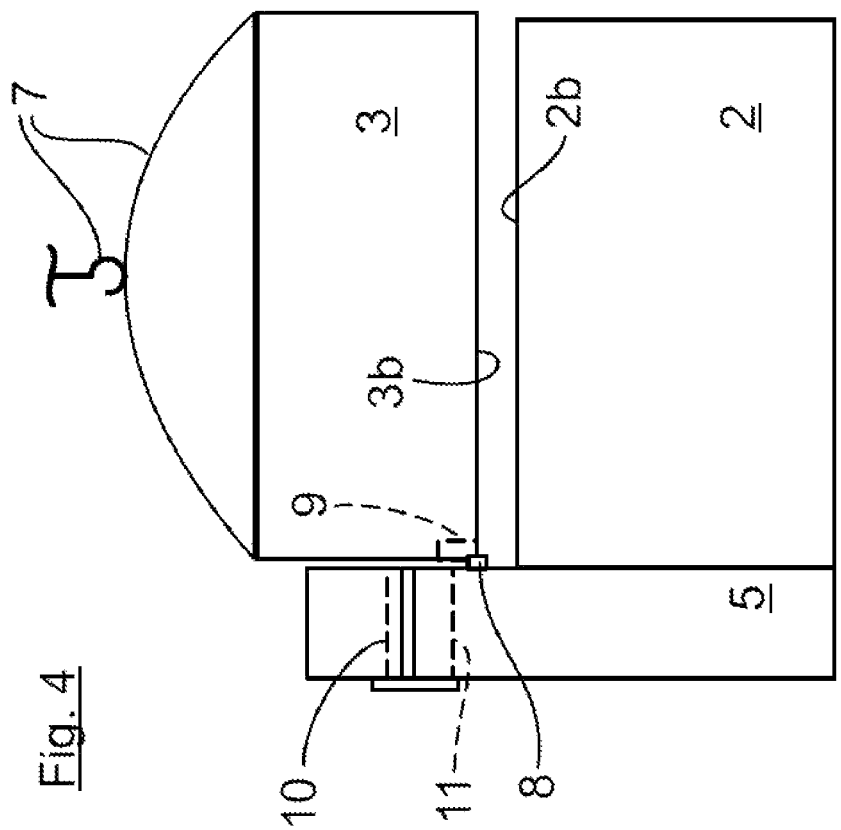

METHOD FOR MOUNTING AN OIL SUMP AND ARRANGEMENT OF AN OIL SUMP ON AN ASSEMBLY FORMED BY A CRANKCASE AND A FLYWHEEL HOUSING

CROSS REFERENCE TO RELATED APPLICATIONS

The present application claims priority of DE 10 2014 002 570.5, filed Feb. 26, 2014, which is incorporated herein by reference.

BACKGROUND OF THE INVENTION

The present invention concerns a method for mounting an oil sump on an assembly of an internal combustion engine, with a crankcase and flywheel housing attached thereto, and an arrangement of an oil sump on an assembly formed by a crankcase and a flywheel housing.

In internal combustion engines of massive self-supporting construction, for example for commercial vehicles such as, e.g., agricultural tractors, the individual components—principally the crankcase, the flywheel housing and the oil sump—are relatively heavy and consequently difficult to handle during series installation but also during repairs. For example, when attaching the oil sump to the assembly of crankcase and flywheel housing, particular care must be paid to the mutually adjacent sealing surfaces running in two parting planes oriented substantially vertically to each other (these surfaces may be flat seals, adhesive beads etc.), wherein in particular damage or displacement can occur due to the flange connections being joined while out of parallel or tilted. It must also be ensured that the mutually adjacent flange faces lie in precise alignment in order to exclude leakages with process-reliability.

BRIEF SUMMARY OF THE INVENTION

An object of the invention is to provide a method and an arrangement allowing a process-reliable assembly of an internal combustion engine, also particularly suitable for repairs, in particular preventing leaks or damage on the joint or sealing surfaces.

According to an embodiment of the invention, a method is proposed for mounting an oil sump on an assembly formed by a crankcase and a flywheel housing of an internal combustion engine, in particular an internal combustion engine for commercial vehicles, and/or an arrangement of an oil sump on an assembly formed by a crankcase and a flywheel housing, wherein the flywheel housing has a first, preferably uniform parting plane to the crankcase and to the oil sump, in which in mounted state the respective joint faces of the flywheel housing, the crankcase and the oil sump lie on each other directly or indirectly (i.e. in particular with the interposition of a gasket, for example as a sealing compound or in the form of a sealing ring) in an abutment connection. The crankcase furthermore has a second parting plane to the oil sump, in which in mounted state the joint faces of the crankcase and the oil sump lie on each other directly or indirectly (i.e. in particular with the interposition of a gasket, for example as a sealing compound or in the form of a sealing ring) in an abutment connection, wherein according to the method, firstly the crankcase and the flywheel housing are joined into one assembly onto which the oil sump is then attached. According to the invention it is proposed that at least one guide is provided between the flywheel housing and the oil sump, by means of which at least the joint faces of the oil sump and the crankcase are oriented relative to each other during connection of the oil sump to the assembly formed by the crankcase and the flywheel housing, such that on creation of the abutment connection between the oil sump and the crankcase, these joint faces are oriented substantially planar parallel during mounting.

Such a solution according to the invention ensures that the oil sump is not inclined, twisted and/or tilted during assembly, and therefore a unilateral or tilted application of the oil sump with corresponding damage to the sealant (for example smearing of an applied adhesive bead or damage to a flat seal etc.) is reliably avoided. Also the process-reliability of the mounting process is increased. This advantageously also facilitates the mounting of very heavy oil sumps, such as those used for example in commercial vehicles, such as, e.g., agricultural tractors.

The term "planar parallel" describes mutually assigned surfaces or surface regions which are oriented parallel to each other and in mounted state lie on each other directly or indirectly in a planar abutment connection. This term explicitly also includes embodiments in which the mutually assigned joint faces, for example of the oil sump and the crankcase, comprise for example shoulders or steps and hence the joint faces do not themselves form a continuous planar surface, insofar as it is ensured that the mutually assigned surface regions are oriented parallel to each other and in mounted state lie on each other directly or indirectly in a superficial abutment connection.

The at least one guide is formed for example in concrete terms by at least one guide element allowing only a movement of the oil sump in the mounting and application direction, by means of which, in a final oil sump mounting step, the oil sump is moved along the parting plane in the direction of the crankcase without twisting about and/or tilting relative to an oil sump axis running transversely to the mounting and application direction. For particularly simple handling, the at least one guide element here is formed by at least one linear guide element allowing only a linear movement of the oil sump in the mounting and application direction.

A solution according to the invention is particularly preferred which has a structure in which the first parting plane between the flywheel housing, the crankcase and the oil sump is oriented substantially perpendicular to the second parting plane between the crankcase and the oil sump.

According to an embodiment, in a first oil sump mounting step, the oil sump and the flywheel housing are joined together by the at least one guide, such that the joint faces of the oil sump and the flywheel housing come to lie superficially on each other directly or indirectly (i.e. in particular with the interposition of a gasket) in the parting plane, but the movement of the oil sump relative to the flywheel housing is still allowed, so that in a final oil sump mounting step, the oil sump can be moved along the parting plane or joint faces between the flywheel housing and the oil sump in the direction of the crankcase, guided by the at least one guide.

The at least one guide is preferably formed by at least one pin-slot connection, preferably by several pin-slot connections, between the flywheel housing and the oil sump, in which a pin, preferably in the form of a bolt, cooperates with a slot which is substantially adapted in form and/or contour to the pin (or with a slight predefined gap size) and hence receives the pin in a guided manner. The at least one pin-slot connection, or where applicable only some of the several pin-slot connections, is or are advantageously configured in the form of a bolt connection so that in a double function, this can be used not only for guidance but also for fixing the components alternatively or in addition to the bolt connections which are in any case provided. Particularly preferably, while the oil sump has not yet been placed on to the crankcase, the at least one bolt forming the at least one pin is initially tightened, in particular pre-fixed, with a pre-defined torque in order to position the oil sump relative to the flywheel housing and the crankcase, wherein then the oil sump is transferred to the final mounting position, where applicable under its own weight, wherein the at least one bolt connection is tightened to the final torque after the oil sump has reached its final mounting position. The slight tightening of the at least one bolt places the oil sump already substantially flush on the flywheel housing, in particular on a flywheel housing flange forming the joint face to the flywheel housing, and hence allows an advantageous guidance along this face.

The bolt connections can contribute to the strength of the assembly of the crankcase, the flywheel housing and the oil sump, and consequently can be tightened to final torque after final attachment of the oil sump. Where applicable, the bolts already present of a bolt connection between the flywheel housing and the oil sump can be used, which pass through correspondingly designed slot guides as stated above.

The bolt of the respective pin-slot connection may for example be provided in the flywheel housing inside a radially outer connecting flange to the oil sump, and be screwed into corresponding threaded bores of the oil sump.

In an embodiment of the invention, the at least one guide can furthermore comprise at least one feed-in device guiding the oil sump before insertion of the at least one guide pin of the at least one pin-slot connection, with a feed-in groove and a guide pin on the assigned joint faces and/or corresponding parting plane. For this it is preferably provided that the feed-in groove is oriented in or parallel to the mounting and application direction of the oil sump and/or perpendicular to the parting plane between the crankcase and the oil sump. The feed-in groove may for example have a guide portion of the same width and a widening feed-in portion. This causes a virtual pre-centring of the oil sump relative to the crankcase and facilitates the subsequent insertion of the later guide pins or bolts on final mounting. The feed-in groove is preferably configured open towards the second parting plane or the joint face there for advantageous and simple feed-in.

According to a particularly preferred concrete embodiment, at least three pin-slot connections are provided, the straight connecting lines of which form at least one triangle. In this way at low cost, the oil sump is fixed precisely in both the vertical and horizontal direction and oriented in the desired manner.

According to a further preferred embodiment, it is provided that at least two slots are provided on the flywheel side and the oil sump side, each forming part of a pin-slot connection and at the top in relation to the mounting or vertical axis direction of the flywheel housing, and/or spaced from each other in the transverse direction, into which slots corresponding pins, in particular in the form of bolts, on the sump side or flywheel side engage. Below this and spaced from this slot in the vertical axis direction, furthermore at least one lower slot is provided on the flywheel side or oil sump side, which forms part of a lower pin-slot connection and into which a corresponding pin on the flywheel side or oil sump side engages. The lower slot or at least one of the lower slots can thus in some cases also be formed by the feed-in groove.

At this point it is expressly stated that the term "slot" here should be interpreted in a wide sense and also comprises embodiments in which the hole is not limited fully or on all sides by a hole edge (although this is the preferred embodiment of a slot), but is a groove-like, open, channel-like recess, i.e., a groove open on one side.

Furthermore, in the case of a function part which protrudes from the oil sump or the crankcase over the parting plane and which can be inserted in a corresponding receiver of the crankcase or the oil sump, the guide pin can be positioned on the flywheel housing or the oil sump so that this firstly engages in the feed-in groove before the function part comes into contact with the receiver. The function part can for example be a suction line conducting lubricating oil to the internal combustion engine, which opens into a suction channel inside the crankcase (possibly with the interposition of a connector).

This measure further facilitates the mounting of the oil sump and excludes damage to the function part caused for example by connections not being precisely aligned.

One exemplary embodiment of the invention is described in more detail below with reference to the enclosed diagrammatic drawing.

BRIEF DESCRIPTION OF THE DRAWINGS

The drawings show:

FIG. 2 the pre-mounting assembly of crankcase and flywheel housing attached thereto, in inverted arrangement for mounting of the oil sump, with the oil sump situated on a crane in the advance position;

FIG. 3 in a first mounting step, the oil sump advanced from above with flange face laid on the vertical flange face of the flywheel housing;

FIG. 4 in a second mounting step, the partially lowered oil sump which is pre-fixed in the horizontal direction via a guide device with bolts, a guide pin and a feed-in groove;

FIG. 5 in a final mounting step, the oil sump lowered onto the horizontal flange face of the crankcase in the final position and attached to the crankcase and the flywheel housing;

DETAILED DESCRIPTION OF THE PREFERRED EMBODIMENTS

Figure 1:
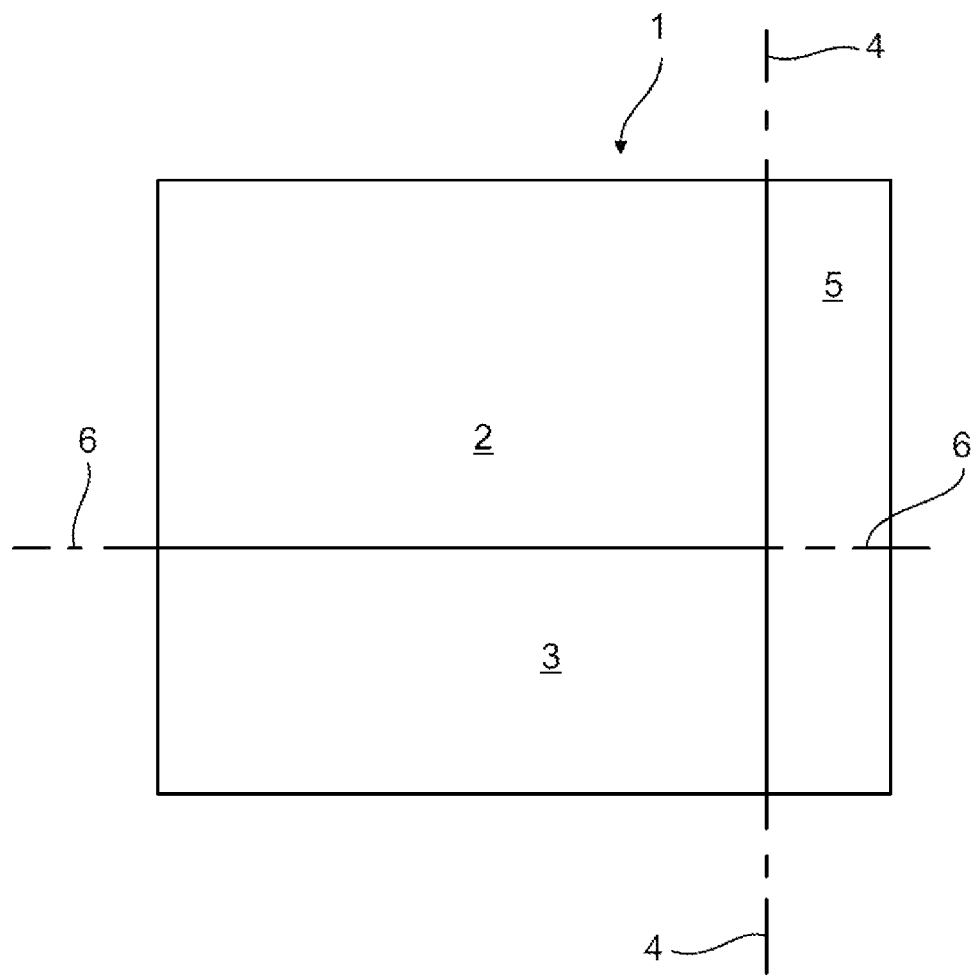
FIG. 1 in a sketch-like depiction, an assembly of an internal combustion engine for commercial vehicles, consisting of a crankcase, an oil sump and a flywheel housing.

FIG. 1 shows, as a rough sketch and only insofar as relevant for understanding the present invention, an internal combustion engine 1 for a commercial vehicle, which consists of a crankcase 2, an oil sump 3 and a flywheel housing 5 flanged thereto in a first vertical parting plane 4.

The flange connection between the crankcase 2 and the oil sump 3, or their respective joint faces, lies in a second horizontal parting plane 6.

On assembly of components 2, 3 and 5, the mutually facing joint or flange faces in parting planes 4 and 6 lie in alignment or planar parallel to each other, in order to prevent leaks, damage to sealants and/or component stresses.

FIGS. 2 to 5 show the mounting sequence according to the invention, in which according to FIG. 2, the relatively massive and heavy oil sump 3 is advanced to the inverted and pre-mounted assembly of crankcase 2 and flywheel housing 5, for example by means of a lifting device 7 or a crane, from above the assembly 2, 5 in relation to a mounting and application direction z and hence in relation to a vertical axis direction (see FIG. 2), and according to FIG. 3 is brought with its vertical joint face or flange 3*a* to rest on the assigned joint face or flange 5*a* of the flywheel housing 5 which protrudes freely upwards.

Then as shown in FIG. 4, the oil sump 3 is partly lowered until a guide pin 8, which is arranged on and protrudes from the joint face or flange 5*a*, enters a feed-in groove 9 (to be described below) which has been worked into the flange 3*a* of the oil sump 3, and thus positions the oil sump 3 laterally (vertically to the drawing plane) in a targeted fashion such that the joint or flange faces 3*a* and 5*a* of the flywheel housing 5 and the oil sump 3 are oriented substantially planar parallel to each other.

Then the oil sump 3, while it is raised from the crankcase 2, is pre-tensioned against the flywheel housing 5 by means of several bolts 10 (FIG. 8) with a defined low tightening torque, so that the joint or flange faces 3*a* and 5*a* of the flywheel housing 5 and the oil sump 3 lie on each other in a superficial abutment connection, preferably with the interposition of a gasket, wherein the oil sump 3 in this pre-fixed state is then oriented with its horizontal joint face or flange 3*b* planar parallel to the joint face or flange 2*b* of the crankcase 2.

Then the oil sump 3 (FIG. 5), where applicable under its own weight, is placed completely on the crankcase 2, wherein the bolts 10 can be moved within the receiving slots 11 (FIG. 8) accordingly relative to the flywheel housing 5. The bolts 10 and their assigned slots 11 thus form pin-slot connections and hence guide means, in the concrete example linear guide means which allow only a linear guidance in the z direction and hence along the parting plane 4.

Due to the positioning of the oil sump 3, oriented precisely by means of the guide means relative to the flywheel housing 5 and then to the crankcase 2, damage to the sealant (for example an adhesive bead, flat gasket etc.) between the oil sump 3 and the crankcase 2 is prevented, because in the final oil sump mounting step, the oil sump 3 is placed on the crankcase 2 without twisting about and/or tilting relative to an oil sump axis Y running transversely to the mounting and application direction Z.

Also in this procedure, any connections of function parts between the oil sump 3 and crankcase 2 can be oriented aligned accordingly.

After application of the oil sump 3, the components are firmly connected together for example by insertion of further bolts (not shown) in the flange 5*a*, 3*a* or 2*b*, 3*b*. Then the three bolts 10—given here as an example—are now tightened to the full, structurally specified tightening torque.

Figure 6:
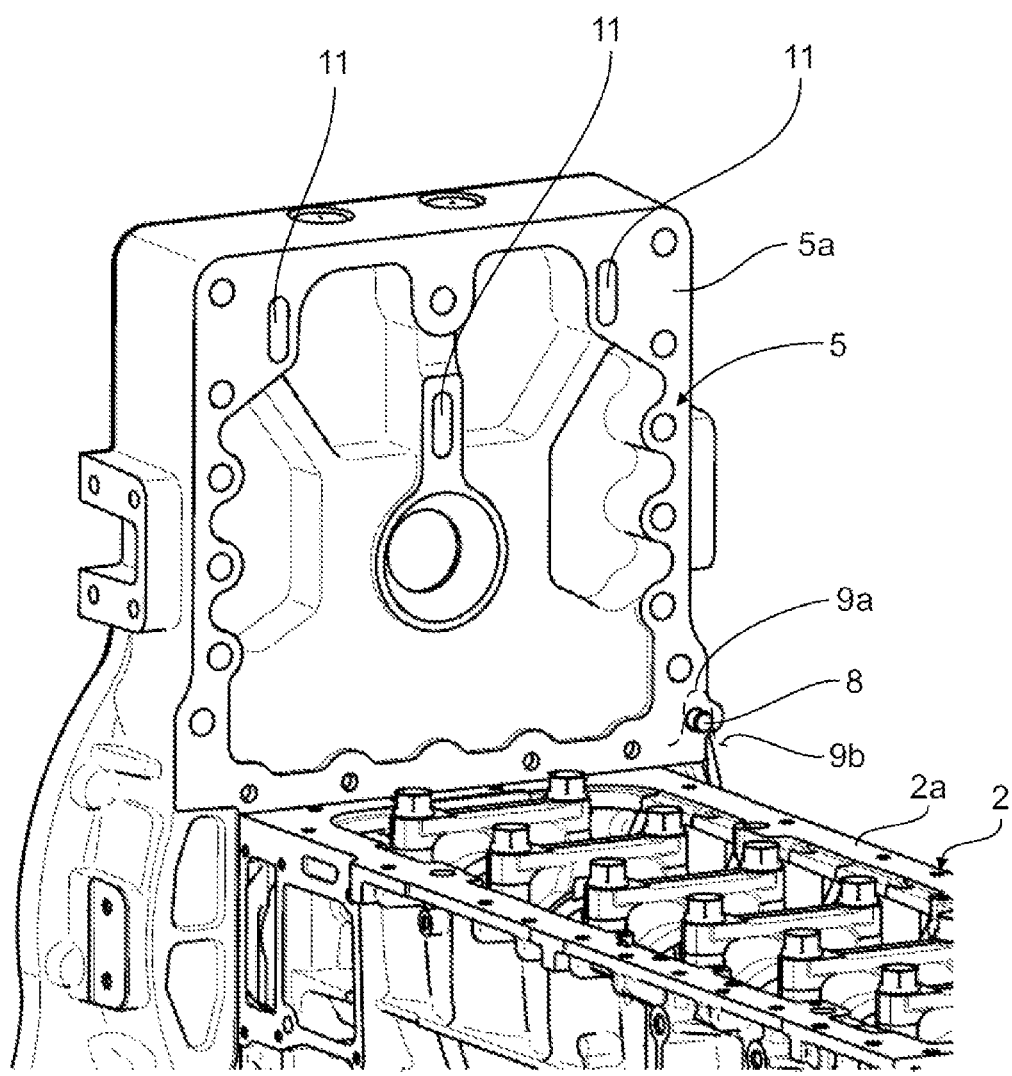
FIG. 6 a three-dimensional view of the flywheel housing attached to the crankcase, showing the guide device with guide pin and feed-in groove on the oil sump.
Figure 7:
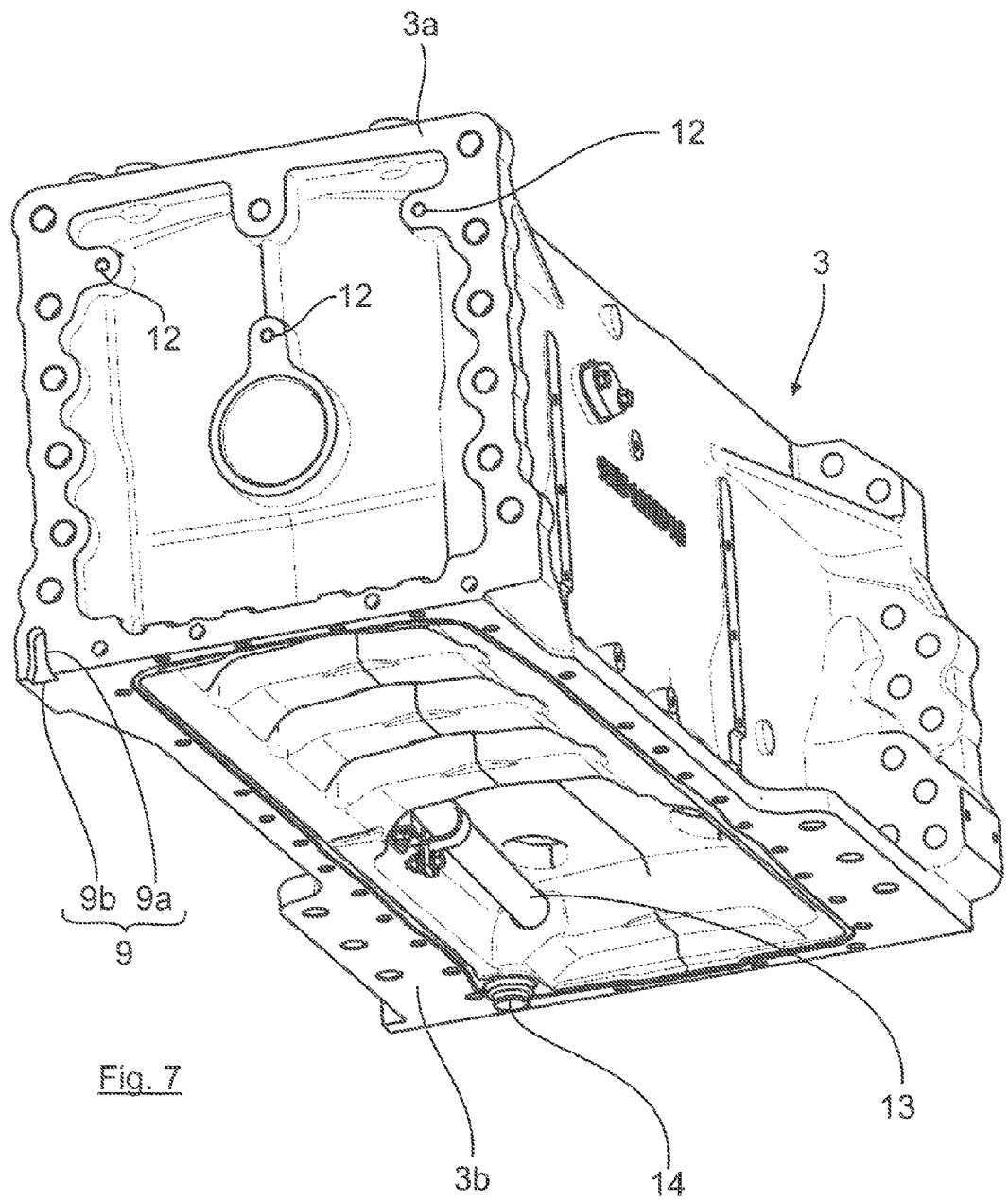
FIG. 7 a three-dimensional view of the oil sump with feed-in groove formed on its flange face facing the flywheel housing, and with a suction line for lubricating oil with pipe connector protruding above the corresponding flange face.

FIG. 6 shows a view of the vertical joint or flange face 5*a* (parting plane 4) of the protruding flywheel housing 5 and the horizontal joint or flange face 2*b* (parting plane 6) of the crankcase 2. According to the mounting position of FIG. 4, the guide pin 8 protruding from the joint and flange face 5*a* now engages in the feed-in groove 9 (merely indicated here, see also FIG. 7) of the oil sump 3 and fixes this laterally, as stated. A kinematic reversal, i.e., an arrangement of the guide pin on the oil sump and a formation of the feed-in groove on the connecting or flange face 5*a*, is naturally also possible.

The feed-in groove 9 preferably has a rectilinear portion 9*a* of the same width corresponding to the guide pin 8, and a widening portion 9*b* open to the joint or flange face 2*b* of the crankcase 2.

Figure 8:
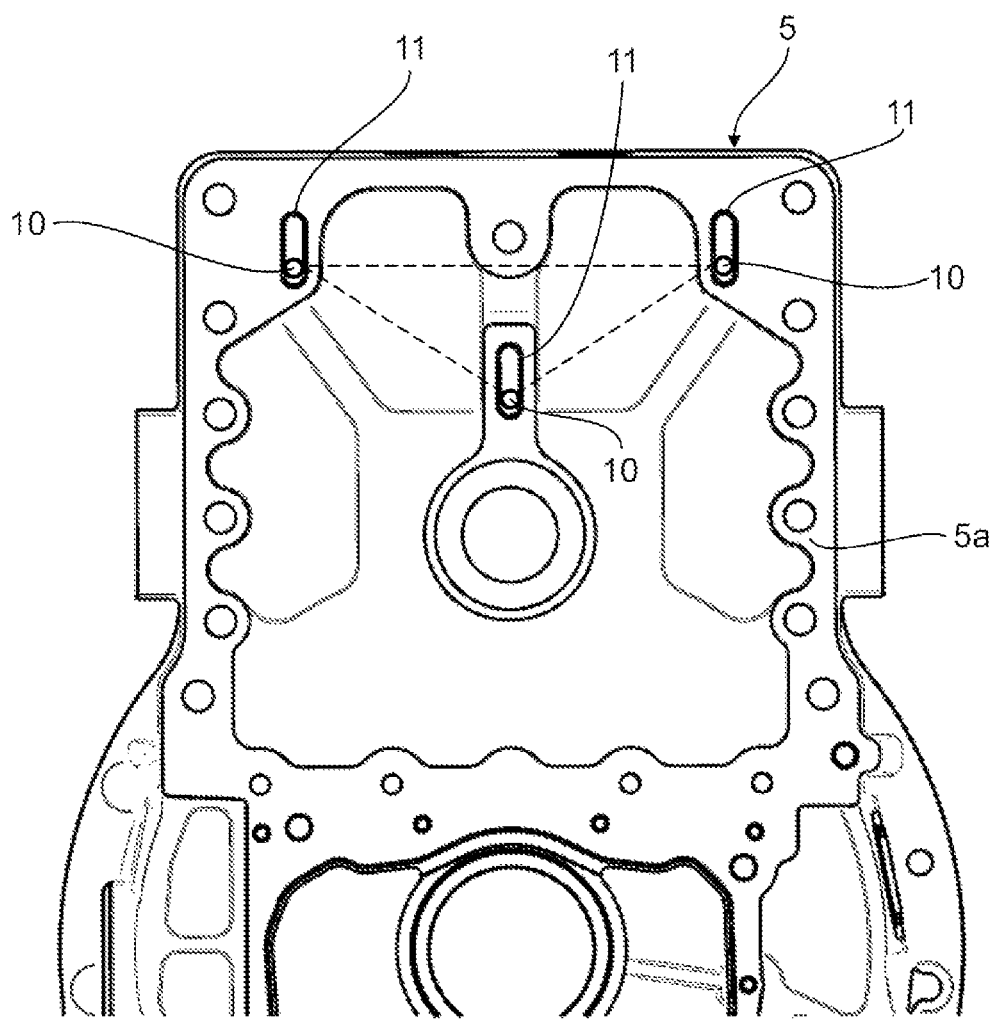
FIG. 8 a partial end view of the flywheel housing with bolts arranged inside the flange face with slot guides for pre-fixing the oil sump during mounting.

FIG. 8 shows an end view of the flywheel housing 5 with the peripheral joint or flange face 5*a*. Within this joint or flange face 5*a*, for example three slots 11 of a pin-slot connection are provided, in each of which a bolt 10, adapted in form and contour, of this pin-slot connection engages.

The slots 11 are all oriented the same way and here preferably oriented in the mounting and application direction z of the oil sump 3, or in other words in the vertical direction, and hence oriented vertically.

Furthermore the straight line connections (shown in dotted lines) through the bolts 10 form a triangle, as can be seen.

The bolts 10 are each screwed at the end into a corresponding threaded bore 12 of the oil sump 3 (FIG. 7), and together with the assigned slots 11, during mounting as described above, allow only a linear guidance for the oil sump 3 in the mounting and application direction z, while holding or fixing the oil sump 3 immovably in any other direction.

As an alternative to the embodiment just described, for example in conjunction with less heavy and massive oil sumps, the feed-in groove 9 and its assigned guide pin 8 may possibly be omitted.

In a further embodiment, one of the slot-bolt connections 10, 11 of FIG. 6, for example the lower central slot 11 in the figure plane of FIG. 6 and its assigned bolt 10, may be omitted and its function assumed by the feed-in groove 9 together with the assigned guide pin 8.

According to these preferred embodiments, it is only important that the guide means supporting the movement of the oil sump 3 preferably forms at least one triangular three-point mounting, so that the oil sump cannot tilt or twist during mounting.

For example a suction line 13 is arranged as a function part in the oil sump 3, not described in more detail, and in the normal manner conducts lubricating oil for the internal combustion engine 1 from an oil sump (not shown), and is connected to a suction channel in the crankcase 2 (not shown) via a pipe connector 14 protruding above the connecting or flange face 3*b*.

The guide device or guide pin 8 with the feed-in groove 9 on the flange face 5*a* of the flywheel housing 5 and on the oil sump 3 are configured such that, on mounting of the oil sump 3, firstly the oil sump 3 is pre-fixed before the pipe connector 14 comes into contact with the corresponding suction channel in the crankcase 2. This ensures that the pipe connector 14 aligns with the suction channel and no damage can occur to sealing elements.

LIST OF REFERENCE NUMERALS

1 Internal combustion engine
2 Crankcase
2*b* Horizontal joint or flange face
3 Oil sump
3*a* Vertical joint or flange face
3*b* Horizontal joint or flange face
4 Vertical parting plane
5 Flywheel housing
5*a* Joint or flange face
6 Horizontal parting plane 7 Lifting device
8 Guide pin
9 Feed-in groove
9a Rectilinear portion
9b Widened portion
10 Bolts
11 Slot guides
12 Threaded bores
13 Suction line
14 Pipe connector

The invention claimed is:

1. A method for mounting an oil sump on an assembly formed by a crankcase and a flywheel housing of an internal combustion engine, wherein the flywheel housing has a joint face that forms a first parting plane with a first joint face of the crankcase and a first joint face of the oil sump, the joint face of the flywheel housing forming the first parting plane lies directly or indirectly on the first joint face of the crankcase and the first joint face of the oil sump in an abutment connection in the mounted state, and wherein the crankcase has a second joint face that forms a second parting plane with a second joint face of the oil sump, the second joint face of the crankcase and the second joint face of the oil sump forming the second parting plane lie on each other directly or indirectly in an abutment connection in the mounted state, the method comprising the steps of:
 joining the crankcase and the flywheel housing to form the assembly;
 attaching the oil sump on the assembly;
 providing at least one guide between the joint face of the flywheel housing and the first joint face of the oil sump, the at least one guide orienting at least the second joint face of the oil sump and the second joint face of the crankcase relative to each other during the step of attaching the oil sump to the assembly, such that the second joint face of the oil sump and the second joint face of the crankcase are oriented substantially planar parallel during mounting on creation of an abutment connection between the oil sump and the crankcase,
 wherein the at least one guide is disposed on the joint face of the flywheel housing and on the first joint face of the oil sump.

2. The method according to claim 1, wherein the step of attaching the oil sump on the assembly includes a final oil sump mounting substep in which the oil sump is moved along the first parting plane in the direction of the crankcase in the mounting and application direction (z), wherein at least one guide element of the at least one guide prevents at least one of twisting about and tilting relative to an oil sump axis running transversely to the mounting and application direction.

3. The method according to claim 2, wherein the at least one guide element used in said step of attaching comprises at least one linear guide element allowing only a linear movement of the oil sump in the mounting and application direction.

4. The method according to claim 3, wherein the first parting plane between the flywheel housing, the crankcase and the oil sump is oriented substantially perpendicular to the second parting plane between the crankcase and the oil sump.

5. The method according to claim 2, wherein the first parting plane between the flywheel housing, the crankcase and the oil sump is oriented substantially perpendicular to the second parting plane between the crankcase and the oil sump.

6. The method according to claim 1, wherein the step of attaching the oil sump includes a first oil sump mounting step in which the oil sump and the flywheel housing are joined together by the at least one guide, such that the first joint face of the oil sump and joint face the flywheel housing come to lie on each other directly or indirectly in the first parting plane, and a movement of the oil sump relative to the flywheel housing is still allowed, so that in a final oil sump mounting step, the oil sump is moved along the first parting plane in the direction of the crankcase, guided by the at least one guide.

7. The method according to claim 1, wherein the at least one guide is formed by at least one pin-slot connection between the flywheel housing and the oil sump, in which a pin cooperates with a slot which is substantially adapted to the pin in form or contour, and the step of attaching includes inserting the pin into the slot.

8. The method according to claim 7, wherein the pin is a bolt, and the step of attaching includes initially tightening at least one bolt connection with a predefined tightening torque in order to position the oil sump relative to the flywheel housing and the crankcase, then transferring the oil sump to the final mounting position, and tightening the at least one bolt connection to a final torque after the oil sump has reached a final mounting position.

9. The method according to claim 7, wherein the guide further comprises at least one feed-in device, the step of attaching including guiding the oil sump with the feed-in device before insertion of the at least one guide pin of at least one pin-slot connection, with a feed-in groove on one of the first joint face of the oil sump and joint face the flywheel housing and a guide pin on the other of the first joint face of the oil sump and joint face the flywheel housing.

10. The method according to claim 9, wherein the feed-in groove is oriented at least one of parallel to the mounting and application direction of the oil sump and perpendicular to the first parting plane between the crankcase and the oil sump.

11. The method according to claim 9, wherein a function part protrudes from one of the oil sump and the crankcase over the second parting plane and can be introduced in a corresponding receiver of the crankcase and the oil sump, the method comprises positioning the guide pin on the flywheel housing or the oil sump so that the guide pin first engages in the feed-in groove before the function part comes into contact with the receiver during the step of attaching.

12. The method according to claim 1, wherein the at least one guide is formed by at least one pin-groove connection between the flywheel housing and the oil sump, the step of attaching further comprising attaching at least one bolt connection by inserting a bolt through a slot in the flywheel housing and into a threaded hole in the oil sump, and transferring the oil sump to the final mounting position guided by the at least one guide and the at least one bolt connection.

13. The method according to claim 8, wherein the at least one pin-slot connection includes at least three pin-slot connections, the three pin-slot connections arranged in a triangular three point mounting that prevents tilting and twisting of the oil sump relative to the flywheel housing during mounting.

* * * * *